US010163357B2

(12) United States Patent
Venkatraman et al.

(10) Patent No.: US 10,163,357 B2
(45) Date of Patent: Dec. 25, 2018

(54) NAVIGATION ASSISTANCE DATA AND ROUTE PLANNING FOR DRONES

(71) Applicant: QUALCOMM Incorporated, San Diego, CA (US)

(72) Inventors: Sai Pradeep Venkatraman, Santa Clara, CA (US); Ju-Yong Do, Cupertino, CA (US); Aditya Narain Srivastava, Fremont, CA (US); Weihua Gao, San Jose, CA (US); Benjamin Werner, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/246,170

(22) Filed: Aug. 24, 2016

(65) Prior Publication Data

US 2018/0061251 A1    Mar. 1, 2018

(51) Int. Cl.
*G08G 5/00* (2006.01)
*B64C 39/02* (2006.01)
*G01C 21/20* (2006.01)

(52) U.S. Cl.
CPC .......... *G08G 5/0069* (2013.01); *B64C 39/02* (2013.01); *B64C 39/024* (2013.01); *G01C 21/20* (2013.01);
(Continued)

(58) Field of Classification Search
CPC .......... B60T 7/12; B60T 13/745; B60T 8/171; B60T 8/3255; B60T 7/22; B60T 13/662;
(Continued)

(56) References Cited

U.S. PATENT DOCUMENTS 5,321,489 A * 6/1994 Defour .................. G01S 7/481
342/29
8,639,397 B2   1/2014 Verlut et al.
(Continued)

FOREIGN PATENT DOCUMENTS

CN        102620736 A      8/2012
WO        2016122781 A1    8/2016

OTHER PUBLICATIONS

MDCockpit: Complete UAV Control, Simple UAV Flight Planning with mdCockpit Waypoint Navigation, Retrieved dated on Dec. 16, 2015, and Retrieved from the Internet URL: https://www.microdrones.com/en/products/software/mdcockpit/flight-planning/#/tab-0-2, 5 pages.
(Continued)

*Primary Examiner* — Hussein Elchanti
(74) *Attorney, Agent, or Firm* — Thien T. Nguyen

(57) ABSTRACT

Methods, systems, computer-readable media, and apparatuses for determining a flight route for a flight of an unmanned aerial vehicle (UAV) are presented. The flight-specific route for the UAV is determined dynamically during the flight or in advance before the flight, using navigation assistance data that includes flight-specific navigation assistance data for a plurality of geographic zones determined based on flight-specific information. The flight-specific navigation assistance data includes flight-specific ranking data for the plurality of geographic zones that can be used by the UAV or a server to determine the flight route.

30 Claims, 8 Drawing Sheets

(52) U.S. Cl.
CPC ......... *G08G 5/0013* (2013.01); *G08G 5/0034* (2013.01); *G08G 5/0039* (2013.01)

(58) Field of Classification Search
CPC . B60T 2201/12; B60T 8/4872; B60T 2201/10
See application file for complete search history.

(56) References Cited

U.S. PATENT DOCUMENTS

| | | | |
|---|---|---|---|
| 9,412,278 B1 | 8/2016 | Gong et al. | |
| 2002/0033769 A1* | 3/2002 | Bass | G01S 5/12 342/418 |
| 2005/0230563 A1* | 10/2005 | Corcoran, III | B64C 13/20 244/175 |
| 2009/0257314 A1* | 10/2009 | Davis | G01S 5/18 367/125 |
| 2010/0100269 A1* | 4/2010 | Ekhaguere | G05D 1/101 701/26 |
| 2010/0238956 A1* | 9/2010 | Preuss | G01S 1/042 370/503 |
| 2011/0299732 A1* | 12/2011 | Jonchery | A63H 27/12 382/103 |
| 2013/0179067 A1* | 7/2013 | Trowbridge | G01C 21/3484 701/410 |
| 2014/0032034 A1 | 1/2014 | Raptopoulos et al. | |
| 2015/0226575 A1 | 8/2015 | Rambo | |
| 2015/0302858 A1* | 10/2015 | Hearing | G10L 19/00 381/58 |
| 2015/0336671 A1 | 11/2015 | Winn et al. | |
| 2016/0111006 A1* | 4/2016 | Srivastava | G08G 1/00 701/3 |
| 2016/0140851 A1 | 5/2016 | Levy et al. | |
| 2016/0189549 A1* | 6/2016 | Marcus | G08G 5/0034 701/3 |
| 2016/0225263 A1 | 8/2016 | Salentiny et al. | |
| 2017/0148467 A1* | 5/2017 | Franklin | G10L 25/51 |
| 2017/0154535 A1* | 6/2017 | Downey | G08G 5/0039 |
| 2017/0162064 A1* | 6/2017 | Ubhi | G08G 5/0069 |
| 2017/0178518 A1* | 6/2017 | Foladare | G08G 5/0034 |
| 2017/0243494 A1* | 8/2017 | Taveira | G08G 5/006 |
| 2017/0267343 A1* | 9/2017 | Chen | B64C 39/024 |

OTHER PUBLICATIONS

Partial International Search Report—PCT/US2017/042195—ISA/EPO—dated Nov. 8, 2017.
Written Opinion—PCT/US2017/042195—PCT/ISA/237—dated Jun. 6, 2018.
International Search Report and Written Opinion—PCT/US2017/042195—ISA/EPO—dated Mar. 8, 2018.

* cited by examiner

NAVIGATION ASSISTANCE DATA AND ROUTE PLANNING FOR DRONES

BACKGROUND

Unmanned aerial vehicle (UAV or drone) technology continues to improve rapidly. Drones are able to perform a variety of missions with greater operational flexibility and at a lower cost than comparable manned aircraft. A wide spectrum of users, including industry, private citizens, and governments, are using or are expected to use these systems, which may play a transformative role in fields as diverse as urban infrastructure management, farming, transportation, public safety, coastal security, military training, search and rescue, and disaster response.

However, introducing drones into airspace is challenging to the aviation community. One of the challenges is to make sure that drones do not run into obstacles, airplanes, helicopters, or each other. There are also substantial concerns on drones flying over private, commercial, or restricted areas without knowledge of various restrictions and regulations in different areas or without permissions.

BRIEF SUMMARY

Certain aspects of the disclosure relate to determining a flight route for a UAV. More specifically, techniques disclosed herein relate to determining, dynamically during the flight or in advance before the flight, a flight-specific route for the UAV using navigation assistance data that includes flight-specific data for a plurality of geographic zones determined based on flight-specific information, such as characteristics of the UAV. The flight-specific data may include various types of navigation assistance data and flight-specific ranking data for the plurality of geographic zones that may be used by the UAV or a server to determine the flight route.

In one example, a method that may be performed by a UAV is described. The method may include requesting, by the UAV, navigation assistance data for a flight from a server, where the requesting includes sending flight-specific information to the server. The method may also include receiving, by the UAV, the navigation assistance data from the server, where the navigation assistance data may include flight-specific ranking data for each zone of a plurality of geographic zones, and the flight-specific ranking data for each zone may be determined based on the flight-specific information. The method may further include determining, by the UAV, a flight route for the flight through the plurality of geographic zones based on the flight-specific ranking data for each zone of the plurality of geographic zones.

In various embodiments of the method performed by the UAV, the flight-specific information may include a privilege of an operator of the UAV or a privilege of the UAV, or other characteristics of the UAV, such as a UAV type, range capability, speed capability, height capability, communication capability, physical dimension, and payload of the UAV.

In various embodiments of the method, the navigation assistance data may include one or more types of navigation assistance data selected from physical obstacles, permitted zones, hazard information, prohibited areas, permission requirements, height limits, speed limits, air traffic information, weather conditions, charging stations, parking spots, and safe landing spots. In some embodiments, the navigation assistance data for each zone of the plurality of geographic zones may include flight-specific ranking data for each type of the one or more types of navigation assistance data. In some embodiments, the flight-specific ranking data for a zone of the plurality of geographic zones may be a weighted sum of the flight-specific ranking data for each type of the one or more types of navigation assistance data for the zone. In certain embodiments, the plurality of geographic zones may only include geographic zones near a current location of the UAV.

In some embodiments, determining the flight route for the flight may include determining the flight route in real time during the flight. In some embodiments, determining the flight route for the flight through the plurality of geographic zones may include selecting the flight route from a plurality of possible flight routes based on a sum of the flight-specific ranking data for each geographic zone of the plurality of geographic zones. For example, the sum of the flight-specific ranking data for the geographic zones on each possible flight route of the plurality of possible flight routes may be determined, and the possible flight route with the lowest sum may be selected as the determined flight route.

In various embodiments, the method performed by the UAV may include collecting real-time UAV observed data during the flight, and sending the real-time UAV observed data to the server during the flight.

In another example, a UAV including a wireless communication subsystem and a processing unit communicatively coupled with the wireless communication subsystem is described. The processing unit may be configured to request, via the wireless communication subsystem, navigation assistance data for a flight from a server, and receive, via the wireless communication subsystem, the navigation assistance data from the server. The requesting may include sending flight-specific information to the server. The navigation assistance data may include flight-specific ranking data for each zone of a plurality of geographic zones, and the flight-specific ranking data for each zone may be determined based on the flight-specific information. The processing unit may also be configured to determine a flight route for the flight through the plurality of geographic zones based on the flight-specific ranking data for each zone of the plurality of geographic zones.

In some embodiments of the UAV, the flight-specific information may include a privilege of an operator of the UAV or a privilege of the UAV, or other characteristics of the UAV including at least one of a UAV type, range capability, speed capability, height capability, communication capability, physical dimension, or payload of the UAV.

In various embodiments of the UAV, the navigation assistance data may include one or more types of navigation assistance data selected from physical obstacles, permitted zones, hazard information, prohibited areas, permission requirements, height limits, speed limits, air traffic information, weather conditions, charging stations, parking spots, and safe landing spots.

In some embodiments of the UAV, the processing unit may be configured to determine the flight route for the flight in real time during the flight. In some embodiments, the processing unit may be configured to determine the flight route for the flight through the plurality of geographic zones by selecting the flight route from a plurality of possible flight routes based on a sum of the flight-specific ranking data for each geographic zone of the plurality of geographic zones.

In some embodiments of the UAV, the processing unit may be further configured to collect, using one or more sensors, real-time UAV observed data during the flight, and send, via the wireless communication subsystem, the real-time UAV observed data to the server during the flight.

In another example, a non-transitory computer-readable storage medium including machine-readable instructions stored thereon is described. The instructions, when executed by one or more processing units, may cause the one or more processing units to request, via a wireless communication subsystem, navigation assistance data for a flight of a UAV from a server, and receive, via the wireless communication subsystem, the navigation assistance data from the server. The requesting may include sending flight-specific information to the server. The navigation assistance data may include flight-specific ranking data for each zone of a plurality of geographic zones, and the flight-specific ranking data for each zone may be determined based on the flight-specific information. The instructions may also cause the one or more processing units to determine a flight route for the flight through the plurality of geographic zones based on the flight-specific ranking data for each zone of the plurality of geographic zones.

In various embodiments of the computer-readable storage medium, the flight-specific information may include a privilege of an operator of the UAV or a privilege of the UAV, or other characteristics of the UAV including at least one of a UAV type, range capability, speed capability, height capability, communication capability, physical dimension, or payload of the UAV. In certain embodiments, the navigation assistance data may include one or more types of navigation assistance data selected from physical obstacles, permitted zones, hazard information, prohibited areas, permission requirements, height limits, speed limits, air traffic information, weather conditions, charging stations, parking spots, and safe landing spots.

In certain embodiments of the computer-readable storage medium, determining the flight route for the flight may include determining the flight route in real time during the flight. In some embodiments, determining the flight route for the flight through the plurality of geographic zones may include selecting the flight route from a plurality of possible flight routes based on a sum of the flight-specific ranking data for each geographic zone of the plurality of geographic zones.

In some embodiments of the computer-readable storage medium, the instructions may further cause the one or more processing units to collect real-time UAV observed data during the flight using one or more sensors, and send the real-time UAV observed data to the server during the flight via the wireless communication subsystem.

In an additional example, an apparatus is described. The apparatus may include means for requesting navigation assistance data for a flight of a UAV from a server and means for receiving the navigation assistance data from the server. The requesting may include sending flight-specific information to the server. The navigation assistance data may include flight-specific ranking data for each zone of a plurality of geographic zones, and the flight-specific ranking data for each zone may be determined based on the flight-specific information. The apparatus may further include means for determining a flight route for the flight through the plurality of geographic zones based on the flight-specific ranking data for each zone of the plurality of geographic zones. In certain embodiments, determining the flight route for the flight through the plurality of geographic zones may include selecting the flight route from a plurality of possible flight routes based on a sum of the flight-specific ranking data for each geographic zone of the plurality of geographic zones.

In various embodiments of the apparatus, the flight-specific information may include a privilege of an operator of the UAV or a privilege of the UAV, or other characteristics of the UAV including at least one of a UAV type, range capability, speed capability, height capability, communication capability, physical dimension, or payload of the UAV. The navigation assistance data may include one or more types of navigation assistance data selected from physical obstacles, permitted zones, hazard information, prohibited areas, permission requirements, height limits, speed limits, air traffic information, weather conditions, charging stations, parking spots, and safe landing spots.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

DETAILED DESCRIPTION

Figure 1:
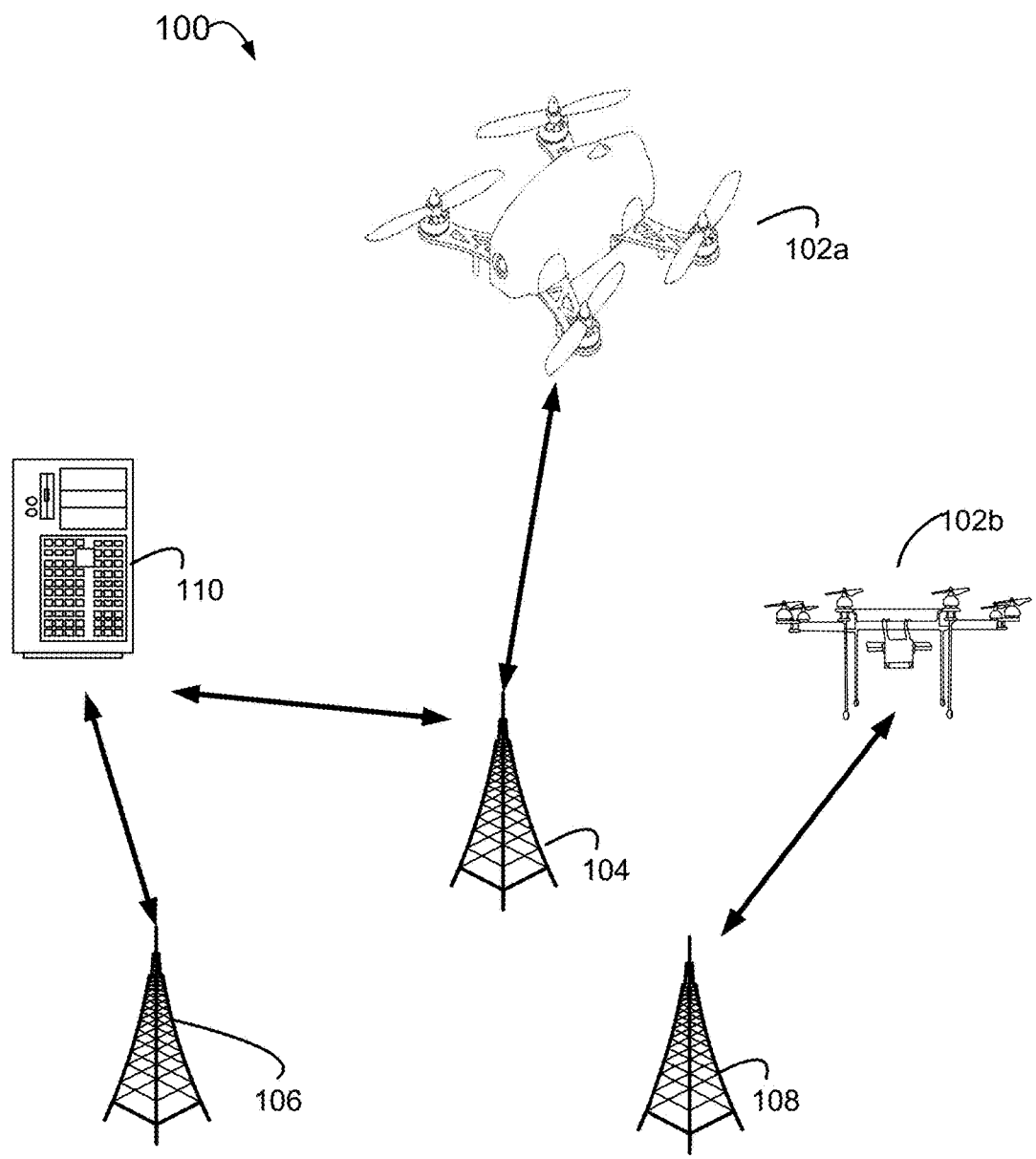
FIG. 1 illustrates an example network system that may be implemented for routing an unmanned aerial vehicle (UAV), according to some embodiments.

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

I. Network System

A wide spectrum of users are using or are expected to use unmanned aerial vehicles (UAVs), which are also commonly referred to as drones. Drones may play a transformative role in fields such as urban infrastructure management, farming, public safety, transportation, coastal security, military training, search and rescue, and disaster response. For example, following the FAA's relaxation of commercial drone flight regulations, some retailers plan to use drones for product delivery.

Drones come in a variety of shapes and sizes. Nonetheless, drones are inherently different from manned aircrafts. Introducing drones into airspace is challenging to the aviation community. For example, the United States has the busiest, most complex airspace in the world. One of the challenges is to make sure that drones do not run into obstacles, airplanes, helicopters, or each other. There are also substantial concerns on drones flying over private, commercial, or restricted areas without knowledge of various restrictions and regulations in different areas or without permissions. In the future, most drones may be required to file a flight plan prior to takeoff, just like manned aircrafts already do.

Furthermore, it is desirable for a drone to receive real-time information regarding an area such that the drone is able to dynamically change its route or flight plan. For example, the drone may need to find a charging station, a parking spot, a safe landing spot, or an alternative route when a condition of an area changes.

Embodiments described herein generally relate to techniques for determining, dynamically during a flight or in advance before the flight, a flight-specific route for a UAV using navigation assistance data that includes flight-specific data for a plurality of geographic zones determined based on flight-specific information, such as characteristics of the UAV. The navigation assistance data may include one or more of obstacles (such as tall buildings), permitted zones, hazards, prohibited areas, special permission requirements, height limits, speed limits, air traffic information, charging stations, parking spots, safe landing spots, route plans, or other data that may be used to determine a flight plan for a UAV. Such navigation assistance data for drones are generally not readily available today. The flight-specific navigation assistance data may include flight-specific ranking data for a plurality of geographic zones that can be used by the UAV or a server to determine a flight route. In general, the flight-specific ranking data comprises data or information to allow a server or the UAV to determine a flight path by identifying zones that are good candidates for the flight path to pass through as well as identifying zones that are not good candidates for the flight path to pass through.

FIG. 1 illustrates an example network system 100 that may be implemented for routing UAVs, according to some embodiments. Network system 100 may include a plurality of UAVs, such as UAVs 102a and 102b, and a plurality of stations, such as stations 104, 106, and 108. Network system 100 may provide navigation assistance data communication for the plurality of UAVs including UAVs 102a and 102b via stations 104-108. UAVs 102a and 102b may include a wireless device for communication and data collection and processing. UAVs 102a and 102b may be UAVs with various shapes, sizes, and capabilities. Stations 104-108 may include fixed ground stations, mobile ground stations, airborne stations, or satellite stations.

Communications to and from UAVs 102a and 102b may be implemented, in some embodiments, using various wireless communication standards and/or protocols. Some embodiments can include, for example, one or more of the Institute of Electrical and Electronics Engineers (IEEE) 802.11 family of standards. Network system 100 may comprise one or more of a variety of networks, including local networks such as a local area network (LAN) or a personal area network (PAN), wide area networks (WANs) such as the Internet, and/or any of a variety of public and/or private communication networks. Moreover, networking technologies can include switching and/or packetized networks utilizing optical, radio frequency (RF), satellite, and/or other technologies.

For example, in some embodiments, network system 100 may employ different data networks and/or network types, such as wireless wide-area networks (WWANs), wireless local area networks (WLANs), or wireless personal area networks (WPANs). A WWAN may be, for example, a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as CDMA2000, Wideband-CDMA (W-CDMA), and so on. CDMA2000 includes IS-95, IS-2000, and/or IS-856 standards. A TDMA network may implement Global System for Mobile Communications (GSM), Digital Advanced Mobile Phone System (D-AMPS), or some other RATs. An OFDMA network may employ Long Term Evolution (LTE), LTE Advanced, and so on. LTE, LTE Advanced, GSM, and W-CDMA are described in documents from 3GPP. CDMA2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

Network system 100 may also include a server computer (or "server") 110. Server 110 may include one or more computing devices capable of processing navigation assistance data and flight-specific information, and communicating with UAVs 102a and 102b regarding flight-specific navigation assistance data. Server 110 may access navigation assistance data from a database (not shown). The database may be stored on one or more computing devices of server 110, or may be stored on one or more computing devices that are remote from and communicatively coupled to server 110. Server 110 may also receive navigation assistance data collected by UAVs 102a and 102b or from other sources and store the received navigation assistance data in the database. Server 110 may be located on-site in an area for which navigation assistance data is being provided, or may be located remotely from such an area. Server 110 may communicate with stations 104-108 using any wired or wireless communication techniques, such as the ones described above.

Network system 100 may be used to provide flight-specific information, such as characteristics of UAVs 102a and 102b, to server 110, provide navigation assistance data that includes flight-specific data for a plurality of geographic zones determined based on the flight-specific information from server 110 to UAVs 102a and 102b, and/or provide crowdsourcing navigation assistance data collected by UAVs 102a and 102b during the flight to server 110, using one or more stations 104-108.

UAV 102a or UAV 102b may send a request to server 110, receive navigation assistance data from server 110, and send real-time UAV observed data to server 110 through one or more stations 104-108. The navigation assistance data may include, for example, physical obstacles (such as tall buildings), permitted zones, hazard information, prohibited areas, special permission requirements, height limits, speed limits, air traffic information, weather conditions, charging stations, parking spots, and safe landing spots. UAVs 102a and 102b may use the navigation assistance data to determine a flight route. The navigation assistance data may include flight-specific ranking data for a plurality of geographic zones. The navigation assistance data may also include a flight route determined by server 110 for a specific UAV based on the request from the UAV.

In some embodiments, a crowdsourcing scheme may be used to provide information from stations 104-108 to UAVs 102a and 102b and/or from UAVs 102a and 102b to server 110. For example, UAVs 102a and 102b may collect real-time UAV observed data during a flight and transmit the collected real-time UAV observed data to server 110 through stations 104-108. UAVs 102a and 102b may be configured to observe real-time data such as hazard conditions, weather conditions, charging stations, and parking spots. Server 110 may use the collected real-time UAV observed data and other navigation assistance data to determine flight-specific navigation assistance data for other UAVs or for subsequent flights of the UAVs that collect the data.

In some embodiments, UAVs 102a and 102b may receive navigation assistance data from multiple stations 104-108, and/or determine the positions of UAVs 102a and 102b based on the locations of stations 104-108 and the distances between UAVs 102a and 102b and stations 104-108.

II. Navigation Assistance Data

For autonomous piloting, a UAV may use a set flight route (e.g., determined before the flight begins) and positioning techniques such as Global Positioning System (GPS) or other anchors, for example, WiFi, WWAN, land or air based reference stations, for navigation. Additionally or alternatively, a UAV may determine a flight route during the flight using information about the area in which the UAV is located, and then use the flight route and the positioning techniques for navigation. Flight route planning for a flight of a UAV may use various information associated with the areas from the source to the destination of the flight. The information may include physical obstacles (such as tall buildings), permitted zones, hazards, prohibited areas, special permission requirements, height limits, and speed limits in different areas or zones. In some embodiments, the information may also include information regarding available services, such as charging stations, parking spots, and safe landing spots. The information may also include real time information regarding the weather conditions and air traffic information in the areas. All such information may collectively be referred to as navigation assistance data (NAD). One or more server may be used to collect, maintain, and update NAD for different areas to facilitate a UAV to determine a flight route beforehand or during the flight for autonomous piloting. In some embodiments, a server may collect flight restriction information, such as, for example, no fly zones, permission requirements, physical obstacles, hazards, or speed limits, into a navigation assistance database.

The NAD may include a map of an area. The map may be a multi-dimensional map including various types of NAD. In some embodiments, the NAD may include information regarding physical obstacles in an area, such as buildings, towers, utility poles, electric wires, etc. The physical obstacles may be described by the heights, bounding boxes, geofences, points of interest (POIs), and special labels etc., which may be defined by geodetic latitude, longitude, and altitude (LLA) coordinates, xyz coordinates, Earth-Centered Inertial (ECI) coordinates, or Earth-Centered-Earth-Fixed (ECEF) coordinates.

For some areas, the NAD may include information regarding no-fly zones or restricted areas, such as military bases, airports, government buildings, medical or utility facilities (e.g., power plants), landmarks (for example, Golden Gate Bridge), and other government or private properties. The no-fly zones or restricted areas may also be described by height restrictions, bounding boxes, geofences, POIs, and special labels defined using various coordinate systems. In some areas, the no-fly restriction may only apply during certain time periods, for example, 7 PM to 7 AM, and thus the NAD may also include information regarding the corresponding time of restriction for the restricted areas.

For some areas, the NAD may include information regarding permission requirements. Certain areas, for example, military bases and medical or utility facilities, may only allow UAVs with special permissions to fly over. No commercial UAVs or private UAVs may be permitted in such areas. Some areas may allow commercial UAVs or private UAVs to fly over if a special license or permit has been purchased or otherwise obtained by an operator of the UAVs or for a specific UAV. For example, a carrier that uses UAVs for product delivery may acquire special privileges to fly over certain areas in order to reduce delivery time and/or reduce fuel or energy consumption. Each restricted zone may have different privilege levels for different drones or users. In some areas, the permission requirements may be different at different time, and thus the NAD may include information regarding the corresponding time of the permission requirements. In some areas, a fee may be collected each time a UAV passes one of these areas. The NAD may include information regarding these areas and the associated fee information.

For some areas, the NAD may include information regarding potential hazards in the areas. For example, certain areas may have high drone loss/damage/loss of contact rate due to, for example, bird strikes, busy traffic, and extreme weather conditions such as wind, rain, or storm. Certain areas may have high risks due to weak navigation signal (e.g., blackout zones). The hazard information in the NAD may include temporary/unexpected events which are not known a priori, for example, birds in path, laser pointer shooters, unexpected weather conditions, objects thrown at the drone, or other unexpected or unpredictable hazardous events. The hazard information may also be based on statistical data and/or real-time UAV observed data.

In some areas, the NAD may include information regarding height limits. For example, in areas such as residential areas, UAVs may not be allowed to fly below a certain height for reasons such as privacy or safety. In some areas, UAVs may not be allowed to fly above a certain height, for example, to avoid interfering with commercial airliners.

The NAD may also include information regarding speed limits in some areas. The speed limits may include a maximum speed limit and/or a minimum speed limit. In some embodiments, the speed limits may be different at different heights.

In various implementations, the NAD, for example, the no-fly zones or restricted areas, speed limits, and height limits, may be different for UAVs with different characteristics, such as special privileges, sizes, shapes, ranges, weights, payloads, speeds, flight heights, and other capabilities.

In some embodiments, the NAD may include information regarding available services, such as charging stations, parking spots, and safe landing spots for UAVs. For example, a UAV may need to be recharged or refueled en route because, for example, the distance of the flight is over the range of the UAV or the UAV is not fully charged or fueled before the flight. Thus, the UAV may need information regarding available charging stations on the route. The charging stations may include public or private charging stations.

The information of the charging stations in the NAD may include the location of the charging stations defined by the LLA coordinates or other coordinate systems, the number of available charging spots, charging time, waiting time at the charging stations, charging costs, capabilities of the charging stations (what types of UAVs can be charged in the charging stations), ratings of the charging stations, and safety levels of the charging stations. For example, some charging stations may provide battery replacement services instead of charging services such that the battery of a UAV can be unplugged and replaced with a pre-charged battery without having to wait for the battery to be recharged. Some charging stations may not be compatible with all UAV types. Some charging stations may only allow UAVs with specific capabilities or equipment for safety purposes.

In some cases, UAVs may use parking spots en route. For example, a UAV may use the parking spots when there is traffic jam, when the UAV is low on battery, when a particular geographic zone has time restrictions (e.g., some zones may only permit UAVs during night), when a particular geographic zone is temporarily unsafe to fly (e.g., due to hazards, unsafe weather conditions, etc.), when there is an emergency situation, or when the UAVs are ordered to clear certain areas. These parking spots may or may not have charging facilities. Thus, in some cases, the NAD may include information regarding rest areas or parking spots. Such information may include the locations of public or private parking stations, the number of available spots at the stations, current wait time if all spots are occupied, parking costs, parking restrictions (e.g., size of the parking slot, maximum weight, type of payload permitted), and ratings indicating whether the stations are reliable and safe for parking.

In some embodiments, the NAD may also include information regarding safe landing spots in different areas. For example, for a UAV that deliveries goods to residential areas, information regarding safe landing spots may be used by the UAV to avoid injuries to people or damages to properties or the UAV itself when delivering goods to different households.

The NAD may also include information regarding air traffic information. For example, as in ground transportations, the NAD may include information regarding congested areas, travelling speeds in the congested areas, alternative routes to the congested areas, and temporary forbidden areas (e.g., due to emergencies).

The NAD may also include information regarding weather conditions. The information regarding weather conditions may include winds, storms, temperature, humidity, air pressure etc. The weather conditions may be provided by a weather service provider or collected by UAVs during flights.

In various embodiments, the NAD in the navigation assistance database may include historic data and real-time data. The data may be detected by the UAVs during their flights. For example, if an unexpected situation (such as weather condition change or emergency situation) happens, a UAV may provide real-time feedback or UAV observed data to a server or other drones through peer-to-peer mash network or through a server. UAVs may also monitor a charging/parking station's current state, for example, whether the station has non-working/defective charging spots, charging time, current availability, wait time, whether the station is safe to park, and whether the station has any restrictions. The UAVs may send the information to the server. The information can be used to estimate the station's rating. The server may also get the current status of a station directly from the station.

In some embodiments, the NAD may also include conditions under water, such as the depth of the water and obstacles under the water, for navigating an underwater unmanned vehicle through the water.

The NAD in the database may be arranged in layers, where each layer may include one or more types of data. For example, one layer may include data regarding no-fly zones, another layer may include height limits, and yet another layer may include minimum and/or maximum speed limits. The NAD in a layer may be grid-based and may include many tiles. The NAD in a layer may also be based on nodes, where each node may have a geographical extent. The NAD in a layer may also be based on points of interest such as tall buildings, no-fly zones, and service stations, and may include geofences surrounding the points of interest. The geofences may be cylindrical zones around a latitude and longitude coordination with various radius and/or heights.

Figure 2:
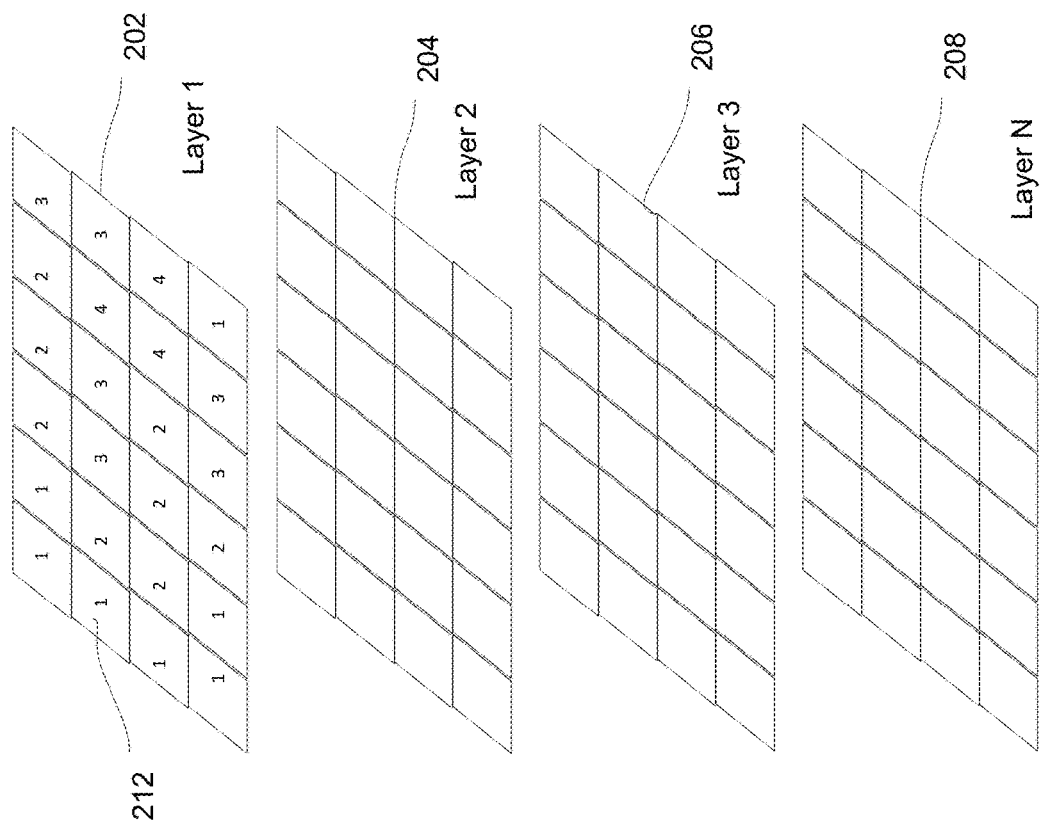
FIG. 2 illustrates example navigation assistance data arranged in different layers for determining flight routes for UAVs.

FIG. 2 illustrates example NAD arranged in different layers for determining flight routes for UAVs. The NAD may include N layers, where each layer may include one or more types of NAD selected from, for example, physical obstacles, restricted areas, permission requirements, potential hazards, height limits, speed limits, charging stations, parking spots, safe landing spots, weather conditions, and air traffic information in the areas as described above. As shown in FIG. 2, each layers of layer 1 202, layer 2 204, layer 3 206, . . . , and layer N 208 may include grid-based tiles 212, each title representing a 2-D or 3-D geographic area or zone. Tiles 212 may have different 2-D or 3-D shapes or sizes. Data for each tile in a layer may include the coordinates of the tile and other NAD described above for the corresponding layer.

III. Flight Routing

When a UAV is scheduled for a flight, a flight plan may be required before the UAV takes off. The source and destination of the flight and one or more characteristics of the UAV may be provided to a server. In some embodiments, in response to obtaining the source and destination of the flight and the one or more characteristics of the UAV, the server may optimize a flight route for the specific flight using the NAD in the database, and send the flight route to the UAV. The flight route may include a corridor that includes a designated region of airspace that the UAV must remain in during its flight through a given region. For example, the corridor may include the path and the ranges in height and width in the airspace.

In some embodiments, the server may determine relevant NAD for a flight based on the source and destination of the flight and one or more characteristics of the UAV, and provide the relevant NAD to the UAV or the computer(s) connected to the UAV. The UAV or the computer(s) connected to the UAV may then determine an appropriate flight plan for the flight.

FIG. 2 may also be used to illustrate example NAD for a specific flight of a specific UAV. The flight-specific NAD data for the specific flight may be determined by a server from all relevant information maintained in a database based on the one or more characteristics of the specific UAV and/or information regarding the specific flight. The characteristics of the specific UAV and/or the information regarding the specific flight may include, for example, the source and destination of the flight, special privileges of the UAV or its operator, the type of the UAV (e.g., fixed wing or rotor based drone), the physical dimensions of the UAV, the flying range, speed, and height capabilities of the UAV, the load that the UAV may carry for the specific flight, the weight of the UAV, and the communication capability of the UAV, etc.

In some embodiments, the server may determine which layer(s) of data to transmit to the UAV based on the characteristics of the UAV. In some implementations, the server may provide the UAV with NAD including NAD for all available layers. In some implementations, the server may only provide the UAV with NAD including one or more but not all layers, based on the flight-specific information sent by the UAV which may include the characteristics of the specific UAV and the specific flight. For example, if a UAV is a fixed wing UAV that will fly at a high altitude, a data layer for physical obstacles may not be needed in certain area. The server may not provide the UAV with information regarding charging stations that cannot charge the specific UAV or information regarding parking spots that do not fit the specific UAV. The server may provide the UAV with NAD that does not include layers associated with charging stations and parking spots if the range of the UAV is much longer than the distance of the specific flight.

In some embodiments, the assistance data in a given layer to be transmitted to a UAV may be determined based on the characteristics of the UAV and/or the information regarding the specific flight. For example, a fixed wing UAV may receive different height and/or speed limits, compared with a rotor-based UAV. As another example, a UAV with special privileges may receive different no-fly zones, and/or height/speed limits. In another example, if the flight-specific information provided by the UAV to the server indicates that the UAV is a battery-powered UAV, the flight-specific NAD may include data related to charging stations. But if the flight specific information provided by the UAV to the server indicates that the UAV is a fuel-powered UAV, the flight-specific NAD may include data related to refueling stations. In another example, the flight-specific NAD may include data related to obstacles, but whether something is to be considered an obstacle or not may depend upon the physical dimensions of the UAV or the capabilities of the UAV. Therefore, appropriate flight-specific NAD may be based on the physical dimensions or capabilities of the UAV that are included in the flight-specific information. In yet another example, some areas may allow commercial UAVs or private UAVs to fly over if a special license, permit, or privilege has been purchased, given, or otherwise obtained by an operator of the UAVs or for a specific UAV. Therefore, appropriate flight-specific NAD may include data about the permissibility of flying within a particular tile or geographical zone for a particular UAV or operator of the UAV, and hence the flight-specific NAD including the correct permissibility and/or privilege data may be based on the identity of the UAV or operator of the UAV that is included in the flight-specific information.

In some implementations, the server may provide the UAV with different layers of NAD for different areas. For example, in some areas, the NAD may not include height limitations, while in some other areas, the NAD may include information regarding height limitations. In some embodiments, a UAV may receive assistance data with different combinations of layers and tiles. For example, the assistance data for tiles near or around the source, destination, or takeoff or landing spot, may include more layers than other tiles, such as tiles in the middle of the flight route.

In some embodiments, the UAV may be able to communicate with a station, such as stations 104-108 in FIG. 1, and may be able to download or receive the flight route or relevant NAD regarding the area near the current location of the UAV from the server as the UAV moves to each new area during the flight. The UAV may then dynamically change the flight plan using the NAD, based on the real-time airspace conditions, such as weather conditions or traffic conditions. In some cases, the server may send real-time instructions to the UAV to avoid hazards such as lightning or storm or avoid areas where emergency clearance is ordered.

In some implementations, the server may provide NAD in all relevant areas from the source to the destination of the flight. In some implementations, the server may only provide NAD in the tiles near the current location of the UAV. In some implementations, the server may provide a determined flight route or relevant NAD for the whole flight to the UAV before the UAV takes off. In some implementations, the server may provide the UAV with NAD including all available air routes for the flight sorted by, for example, travel distance and flight time.

In some embodiments, a UAV may continuously or periodically send telemetry or other data to a server. Based on the telemetry data, a server may monitor the location of the UAV, monitor possible flight restriction violations, or send new tiles of data based on the UAV's current location. In some embodiments, a server may determine UAVs in a same region and send such information to the UAVs in the same region to avoid collision or sideswiping.

In various implementations, each tile or geographic zone in a layer of the flight-specific NAD may include a ranking of the tile for the specific flight. The ranking may be a number as shown in FIG. 2, or other indicators, such as labels or flags. In some implementations, a ranking may be assigned to each tile on each layer of the flight-specific navigation assistance data. In some implementations, a single overall ranking may be assigned to each tile, for example, based on the rankings assigned to the tile in different layers of the flight-specific navigation assistance data. For example, for a NAD layer including potential hazards information, the ranking may indicate the level of risk. A "1" for a tile may indicate that the corresponding area has a low level of risk, while a larger number may indicate a higher level of risk. For a NAD layer including permission requirements, a lower number for a tile may indicate that the corresponding area has a lower level of permission requirement or the UAV or the operator the UAV has the required permissions, and a higher number for a tile may indicate that the corresponding area has a higher level of permission requirement, it may cost more to acquire the permission, or it may require a higher toll fee for flying over the area. For a NAD layer including traffic conditions, a lower number for a tile may indicate that the corresponding area has fewer UAVs flying in that tile or has a better weather condition for UAVs. For a NAD layer including charging station information, a lower number for a tile may indicate that the corresponding area has a charging station with spots available for charging the specific UAV, while a higher number may indicate that no spots are available for the specific UAV or the UAV may need to wait for a spot to become available. The single overall ranking assigned to each tile may be the sum of the rankings assigned to the tile in different layers of the flight-specific navigation assistance data. It is noted that the tiles may be ranked such that a smaller number indicates a higher rank and a larger number indicates a lower rank. Alternatively, the tiles may be ranked such that a larger number indicates a higher rank while a smaller number indicates a lower rank.

In some implementations, the server or the UAV may calculate flight-specific ranking data for each tile of a plurality of tiles by adding the flight-specific ranking data in all layers in the received NAD for each tile near the determined or actual current location of the UAV. In some implementations, the flight-specific ranking data for different layers may have different weights when calculating the sum (where it is possible, for example, for some layers to have a weight of zero). For example, the flight-specific ranking data associated with potential hazards or restricted areas may carry a higher weight, while the flight-specific ranking data associated with charging stations or parking spots may carry a lower weight.

In some implementations, the server or the UAV may determine an appropriate flight route for the flight based on flight-specific ranking data in various tiles, or, alternatively, the server or the UAV may determine a plurality of possible flight routes. For example, the server or the UAV may calculate a sum of the flight-specific ranking data of all tiles through which each route of the plurality of possible routes passes between a start node and an end node in an area, and select the route with the lowest sum as the route in the area for the flight.

Figure 3:
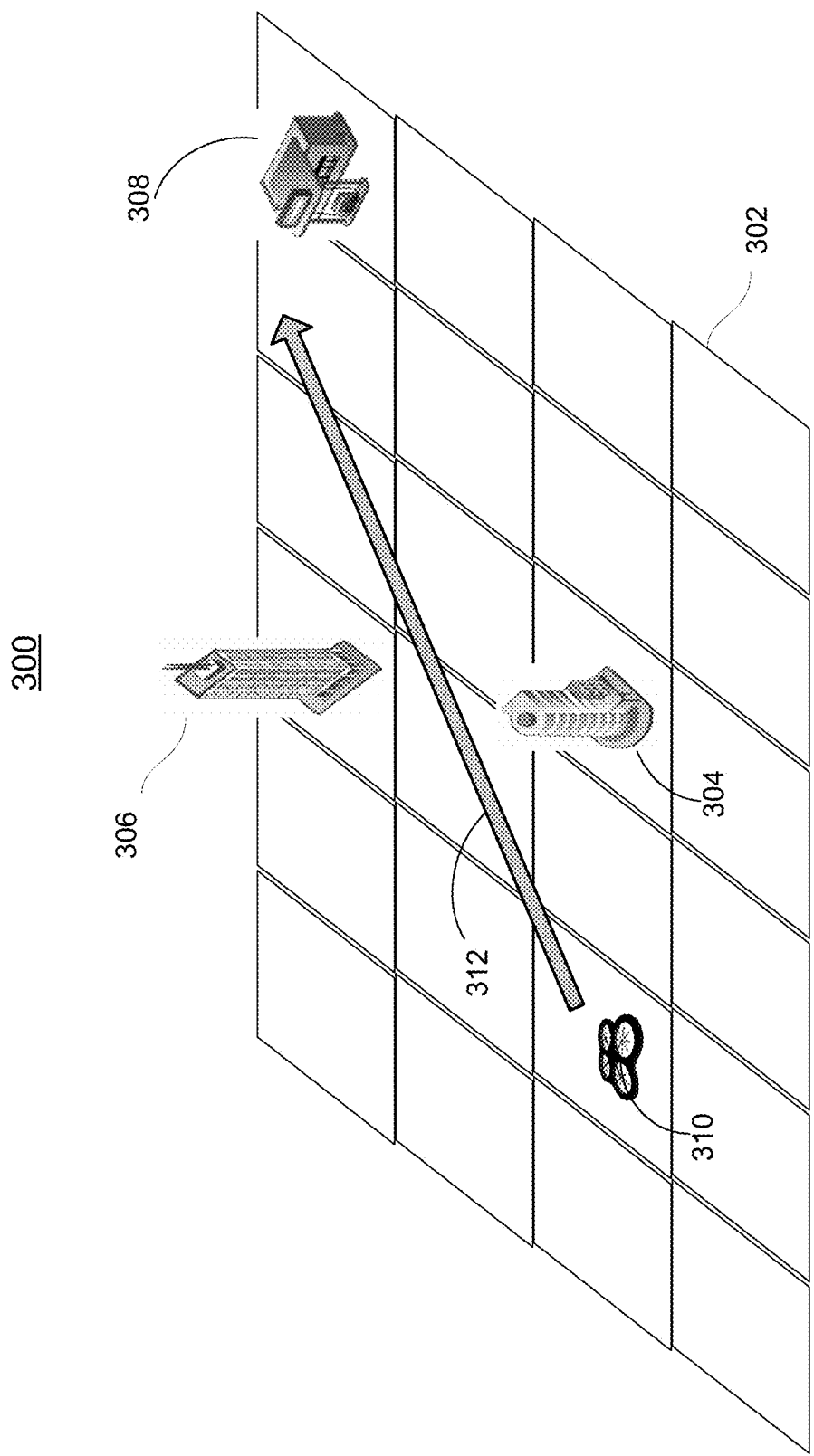
FIG. 3 illustrates an example flight route of a UAV.

FIG. 3 illustrates an example flight route 312 for a UAV 310 in an area 300. Area 300 may be divided into a plurality of zones 302. Area 300 includes a restricted zone near building 304 (e.g., a government building), a physical obstacle 306 (e.g., a tall building), and a charging station 308. A server may determine flight-specific NAD for each zone that includes various layers of data. The NAD for each zone may also include a flight-specific ranking data as described above with respect to FIG. 2. A server may determine a sum of the flight-specific ranking data in all layers as the flight-specific ranking data for the zone for each zone near the determined or actual current location of UAV 310, and send the flight-specific ranking data for each zone to the UAV. Alternatively, the server may send the flight-specific ranking data for all layers to the UAV, and the UAV may determine a sum of the flight-specific ranking data in all layers as the flight-specific ranking data for the zone for each zone near the determined or actual current location of UAV 310. For example, in the restricted zone near building 304 or the zone where physical obstacle 306 is located, the sum of the flight-specific ranking data in all layers may be large due to the high ranking of the zone on the NAD layer associated with restricted areas or physical obstacles. Therefore, the sum of the flight-specific ranking data for all zones on a flight route including the zones where building 304 and physical obstacle 306 are located may be large, and flight route 312 may avoid the zones where building 304 and physical obstacle 306 are located.

For this specific flight, UAV 310 may not need to be charged in area 300, thus the NAD data for area 300 received by UAV 310 from the server may not include the data layer associated with charging station information. Alternatively, the NAD data for area 300 received by UAV 310 from the server may include the data layer associated with charging station information, but the data layer associated with charging station information in the flight-specific ranking data may carry a low weight in calculating the sum of the flight-specific ranking data in all data layers. As such, the fact that charging station 308 is located in a zone does not significantly affect the sum of the flight-specific ranking data in the zone and the sum of the flight-specific ranking data for all zones on any route including the zone where charging station 308 is located, and thus may not affect whether the server or UAV 310 will include or exclude the zone where charging station 308 is located in the flight route.

If, on the other hand, UAV 310 needs to be charged around area 300, the NAD for area 300 received by UAV 310 from the server may include the data layer associated with charging station information, and the flight-specific ranking data for the data layer associated with charging station information may carry a higher weight when calculating the sum of the flight-specific ranking data in all data layers. As such, the fact that charging station 308 is located in a zone may affect the sum of the flight-specific ranking data in the zone significantly and thus may cause the server or UAV 310 to include the zone in the flight route.

IV. Example Methods

Figure 4:
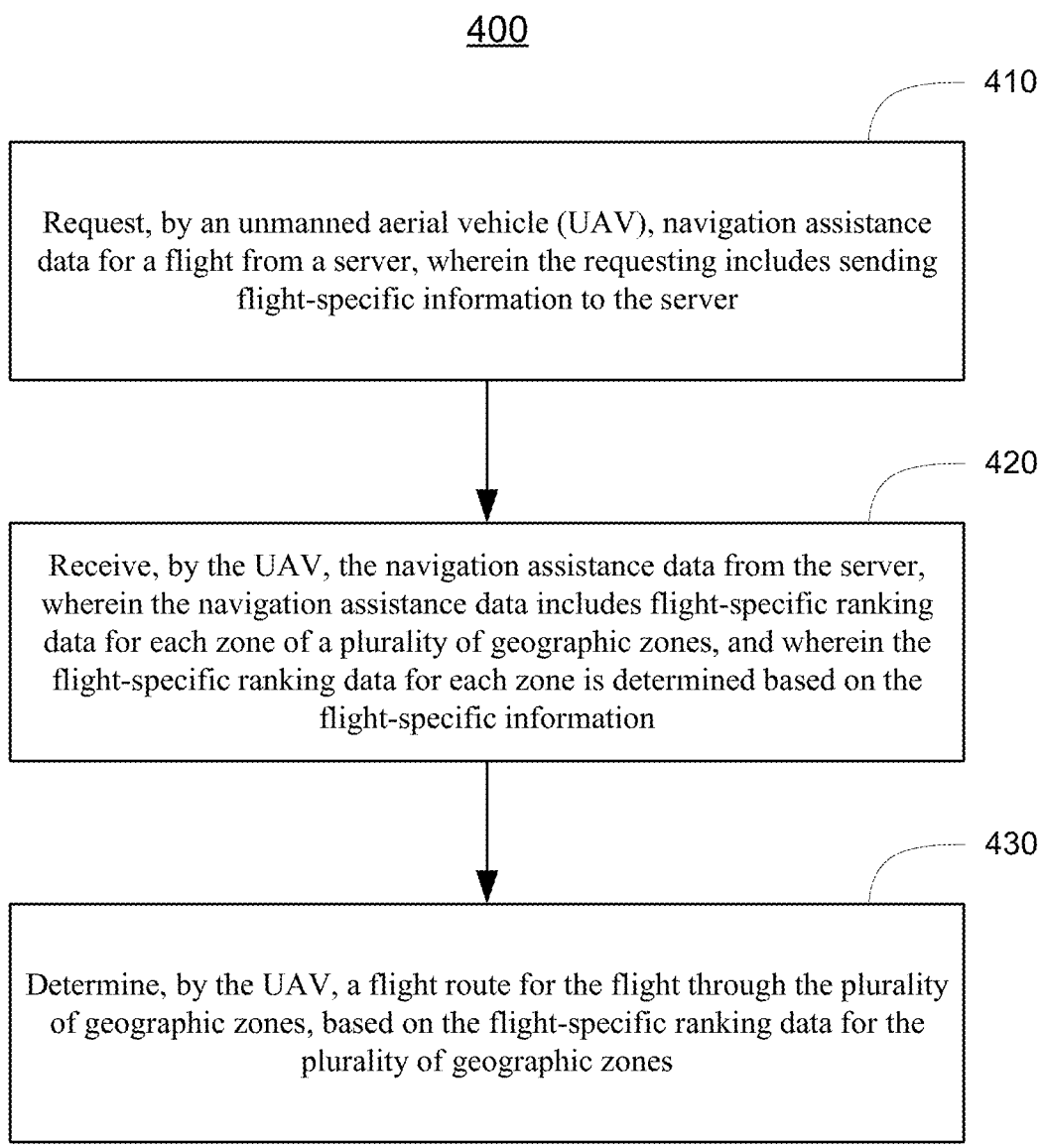
FIG. 4 illustrates an example method of determining a flight route for a UAV by the UAV.

FIG. 4 is a flow chart 400 illustrating an example method of determining a flight route for a flight by the UAV. The example method may be performed by the UAV before the flight or in real time during the flight.

Figure 7:
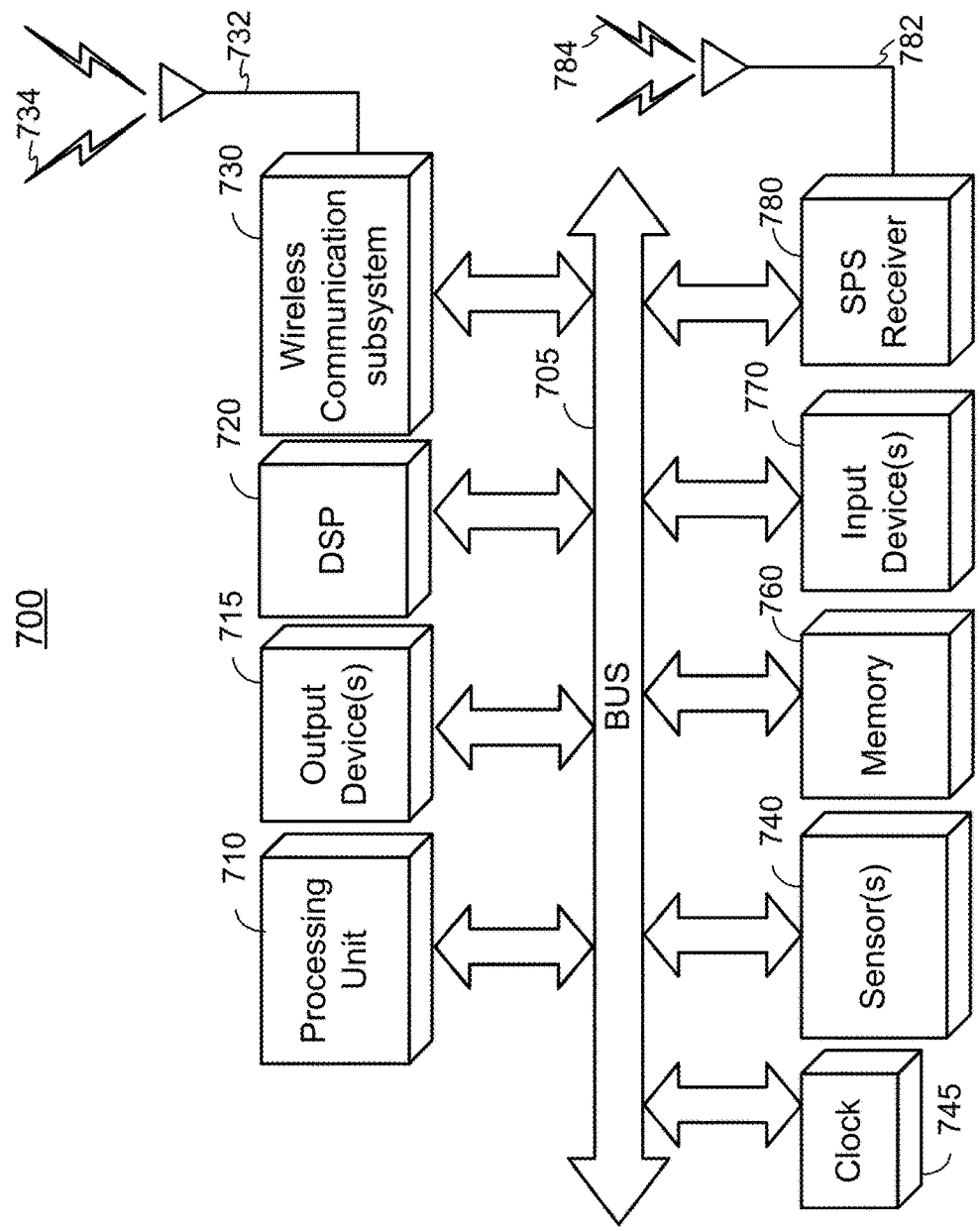
FIG. 7 illustrates an example of a wireless device in which one or more embodiments may be implemented.
Figure 8:
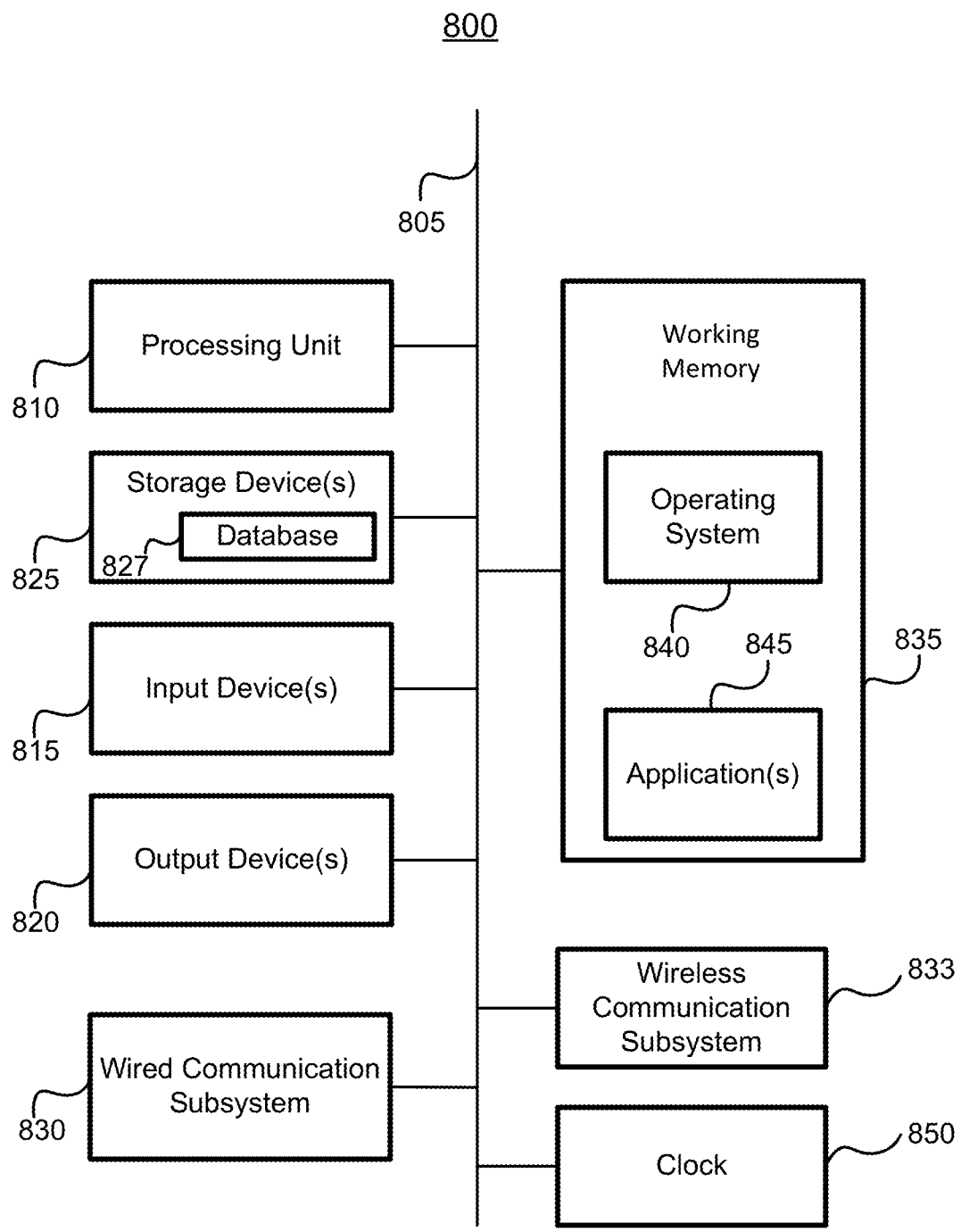
FIG. 8 illustrates an example of a computing system in which one or more embodiments may be implemented.

At block 410, the UAV may request NAD for a specific flight from a server. The requesting may include sending flight-specific information to the server. As described above, the flight-specific information may include the source and destination of the flight and one or more characteristics of the UAV. The one or more characteristics may include, for example, special privileges of the UAV or its operator, the type of the UAV (e.g., fixed wing or rotor based UAV), the physical dimensions of the UAV, the flying range, speed, and height capabilities of the UAV, the load that the UAV may carry for the specific flight, and the communication capabilities of the UAV. The server may maintain a database that includes various types of NAD as described above. Based on the flight-specific information provided by the UAV in the request, the server may determine the appropriate flight-specific NAD to the UAV. In various embodiments, means for performing the function at block 410 may include, but are not limited to, for example, wireless communication subsystem 730, processing unit 710, memory 760, and/or bus 705 as illustrated in FIG. 7 and described in detail below. In some embodiments, means for performing the function at block 410 may include, but are not limited to, for example, wireless communication subsystem 833, processing unit 810, working memory 835, and/or bus 805 as illustrated in FIG. 8 and described in detail below.

At block 420, the UAV may receive the flight-specific NAD from the server. The flight-specific NAD may include flight-specific ranking data for each zone of a plurality of geographic zones as described above with respect to FIG. 2. The flight-specific ranking data for each zone may be determined by the server based on the flight-specific information provided by the UAV at block 410. In various cases, the flight-specific NAD may include data associated with various types of NAD selected from, for example, physical obstacles, restricted areas, permission requirements, potential hazards, height limits, speed limits, charging stations, parking spots, safe landing spots, weather conditions, and air traffic information in the areas as described above. The server may send to the UAV flight-specific NAD for one or more but not all types of NAD regarding a zone. The server may send to the UAV flight-specific data for different types of NAD for different zones. The server may send to the UAV flight-specific NAD for an entire area including the source and the destination of the specific flight along with geographic zones connecting the source and the destination. Alternatively, the server may only send to the UAV flight-specific NAD for a portion of the area, such that the plurality of geographic zones for which flight-specific NAD is sent to the UAV includes only geographic zones near the current location of the UAV. As the UAV moves in flight, the server may send NAD for the geographic zones near the in-flight current location of the UAV. As described above, in some implementations, the server may send flight-specific ranking data for each layer of the NAD in each zone, rather than a single overall flight-specific ranking data for each zone. In various embodiments, means for performing the function at block 420 may include, but are not limited to, for example, wireless communication subsystem 730, processing unit 710, memory 760, and/or bus 705 as illustrated in FIG. 7 and described in detail below. In some embodiments, means for performing the function at block 420 may include, but are not limited to, for example, wireless communication subsystem 833, processing unit 810, working memory 835, and/or bus 805 as illustrated in FIG. 8 and described in detail below.

At block 430, the UAV may determine a flight route for the specific flight through the plurality of geographic zones, based on the flight-specific ranking data for the plurality of geographic zones. For example, the UAV may select a flight route from a plurality of possible routes based on a sum of the flight-specific ranking data for all zones on each route of the plurality of possible routes. Example techniques for determining the flight route based on the flight-specific ranking data are described in detail below with respect to FIG. 6. While in flight, in some embodiments, the UAV may collect real-time UAV observed data during the flight and send the real-time UAV observed data to the server during the flight. Such crowdsourced data may be used by the server to update flight-specific NAD that may be sent to UAVs in real time or to update historic data used by the server to generate flight-specific NAD. In various embodiments, means for performing the function at block 430 may include, but are not limited to, for example, processing unit 710, digital signal processor (DSP) 720, memory 760, and/or bus 705 as illustrated in FIG. 7 and described in detail below. In some embodiments, means for performing the function at block 430 may include, but are not limited to, for example, processing unit 810, working memory 835, and/or bus 805 as illustrated in FIG. 8 and described in detail below.

Figure 5:
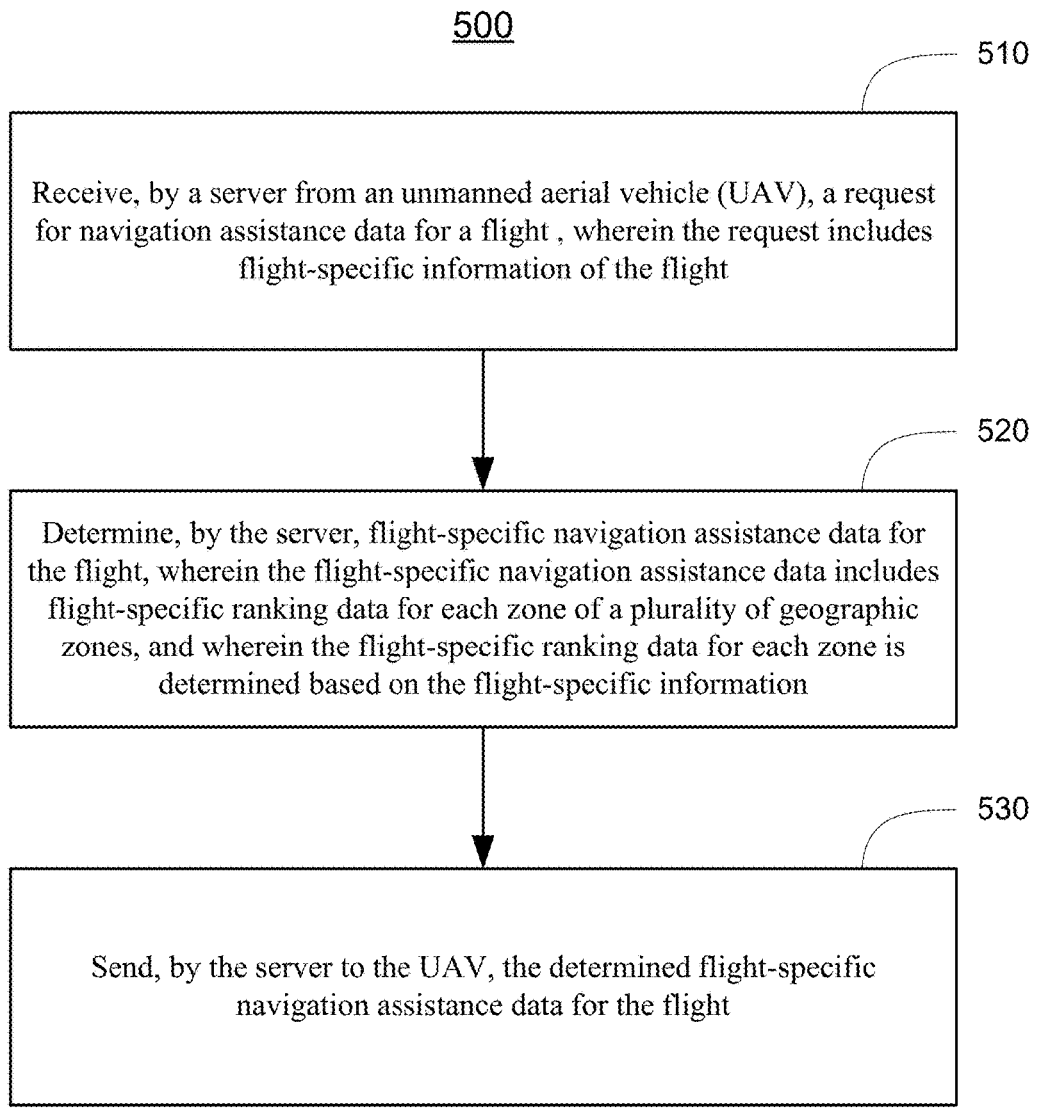
FIG. 5 illustrates an example method of determining a flight route for a UAV by a server.

FIG. 5 is a flow chart 500 illustrating an example method of determining a flight route for a flight by a server. The example method may be performed by the server before the flight or in real time during the flight.

At block 510, the server may receive a request for NAD for a flight from an unmanned aerial vehicle. The request may include flight-specific information of the flight, such as the source and destination of the flight and one or more characteristics of the UAV as described above with respect to block 410 of FIG. 4. In various embodiments, means for performing the function at block 510 may include, but are not limited to, for example, processing unit 710, memory 760, wireless communication subsystem 730, and/or bus 705 as illustrated in FIG. 7 and described in detail below, and processing unit 810, working memory 835, wireless communication subsystem 833, and/or bus 805 as illustrated in FIG. 8 and described in detail below.

Figure 6:
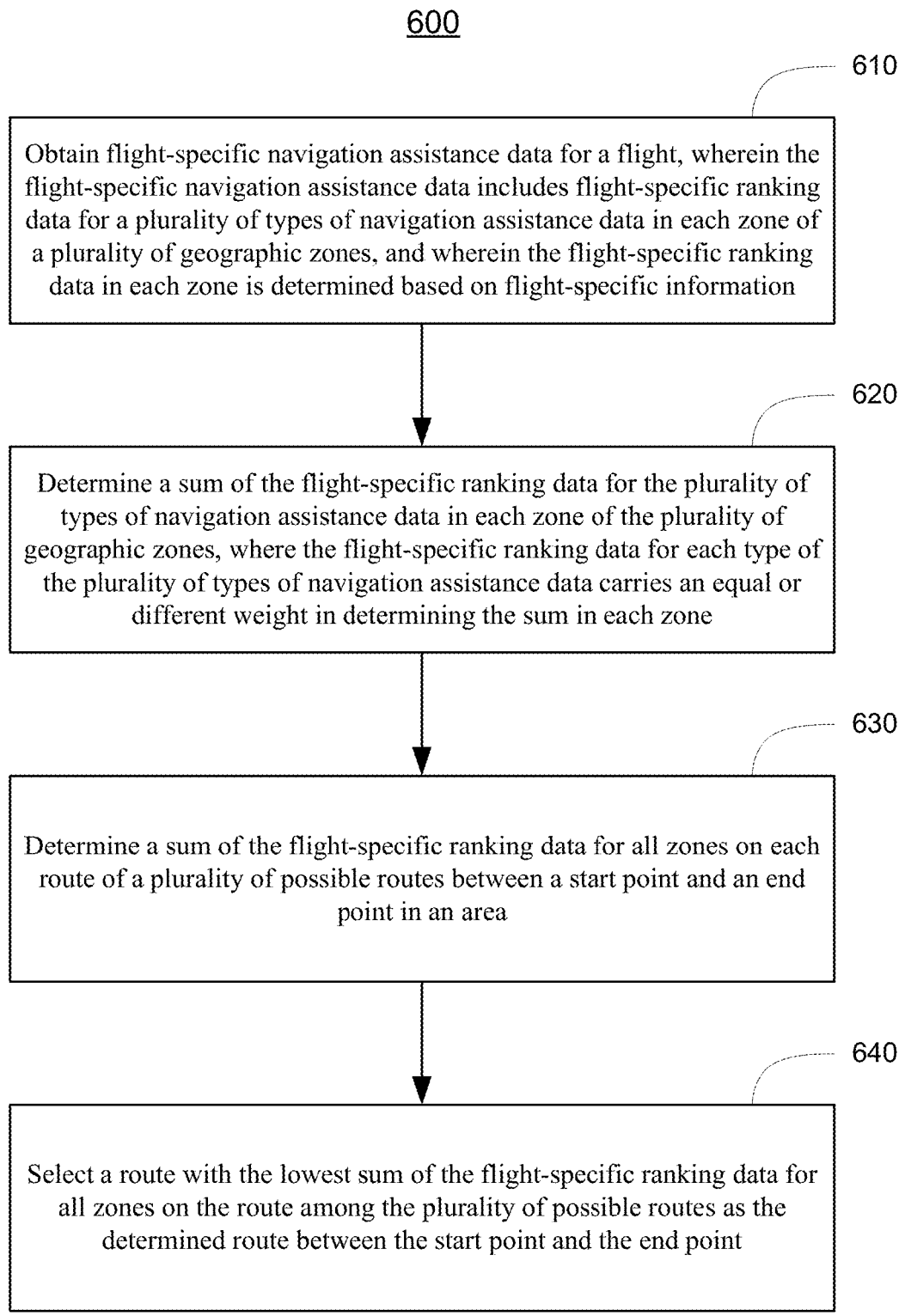
FIG. 6 illustrates an example method of determining a flight route for a UAV based on flight-specific ranking data.

At block 520, the server may determine flight-specific NAD for the flight. The flight-specific NAD may include flight-specific ranking data for each zone of a plurality of geographic zones. The flight-specific ranking data for each zone may be determined based on the flight-specific information as illustrated in FIG. 6 and described in detail below. The flight-specific NAD may include one or more but not all types of NAD regarding a zone in the database. The flight-specific NAD may include different types of NAD for different zones. The flight-specific NAD may include data for an entire area including the source and the destination of the specific flight along with geographic zones connecting the source and the destination. Alternatively, the flight-specific NAD may include data for only a portion of the area, such as the zones or tiles near the current location of the UAV. As described above, in some implementations, the server may determine flight-specific ranking data for each layer of the NAD in each zone, rather than a single overall flight-specific ranking data for each zone. In some embodiments, the server may also determine a flight-specific route as described below with respect to FIG. 6. In various embodiments, means for performing the function at block 520 may include, but are not limited to, for example, processing unit 710, DSP 720, memory 760, and/or bus 705 as illustrated in FIG. 7 and described in detail below, and processing unit 810, working memory 835, and/or bus 805 as illustrated in FIG. 8 and described in detail below.

At block 530, the server may sent the determined flight-specific NAD for the flight to the UAV. As described above, in some embodiments, the flight-specific NAD may include flight-specific ranking data for each zone of a plurality of geographic zones. The UAV may then determine a flight route based on the flight-specific NAD as illustrated in FIG. 6 and described in detail below. In some embodiments, the flight-specific NAD may include a flight-specific route determined by the server for the flight. In various embodiments, means for performing the function at block 530 may include, but are not limited to, for example, processing unit 710, memory 760, and/or bus 705 as illustrated in FIG. 7 and described in detail below, and processing unit 810, wireless communication subsystem 833, working memory 835, and/or bus 805 as illustrated in FIG. 8 and described in detail below.

FIG. 6 is a flow chart 600 illustrating an example method of determining a flight route for a flight based on flight-specific ranking data. The example method may be performed by either a UAV or an server before the flight or in real time during the flight.

At block 610, the UAV or the server may obtain flight-specific NAD for the flight. The flight-specific NAD may include a plurality of types of NAD including, for example, physical obstacles, permitted zones, hazards information, prohibited areas, special permission requirements, height limits, speed limits, air traffic information, weather conditions, charging stations, parking spots, and safe landing spots. The flight-specific NAD may include flight-specific ranking data for each type of the plurality of types of NAD in each zone of a plurality of geographic zones as described above with respect to FIG. 2. The flight-specific ranking data in each zone may be determined based on flight-specific information. The flight-specific information may include the source and destination of the flight and one or more characteristics of the UAV as described above with respect to block 410 of FIG. 4. The UAV may obtain the flight-specific NAD from the server by sending a request including the flight-specific information. The server may determine the flight-specific NAD based on the flight-specific information from NAD stored in a database internal or external to the server. The NAD stored in the database may include data collected by various UAVs during previous flights or during current flights in real time. In various embodiments, means for performing the function at block 610 may include, but are not limited to, for example, processing unit 710, DSP 720, memory 760, wireless communication subsystem 730, and/or bus 705 as illustrated in FIG. 7 and described in detail below, and processing unit 810, working memory 835, wireless communication subsystem 833, and/or bus 805 as illustrated in FIG. 8 and described in detail below.

At block 620, the UAV or the server may determine a sum of the flight-specific ranking data for the plurality of types of NAD in each zone of the plurality of geographic zones. In some embodiments, the flight-specific ranking data for each type of the plurality of types of NAD may carry an equal weight in determining the sum in each zone. Thus, the sum for each zone may be determined by adding the flight-specific ranking data for the plurality of types of NAD in each zone. In some embodiments, the flight-specific ranking data for each type of the plurality of types of NAD may carry a different weight in determining the sum for each zone. Thus, the sum for each zone may be determined by adding the product of the flight-specific ranking data for each type of the plurality of types of NAD and the corresponding weight. In various embodiments, means for performing the function at block 620 may include, but are not limited to, for example, processing unit 710, DSP 720, memory 760, and/or bus 705 as illustrated in FIG. 7 and described in detail below, and processing unit 810, working memory 835, and/or bus 805 as illustrated in FIG. 8 and described in detail below.

At block 630, the UAV or the server may determine a sum of the flight-specific ranking data for all zones on each route of a plurality of possible routes between a start point and an end point in an area. In some embodiments, the start point and the end point in an area may be the source and the destination of the flight, respectively. In some embodiments, the start point and the end point in an area may be any point between the source and the destination of the flight. The sum of the flight-specific ranking data for each route may be determined by adding the flight-specific ranking data for each zone on the route. In some embodiments, the UAV or the server may determine the sum of the flight-specific ranking data for each route by adding the flight-specific ranking data for the plurality of types of NAD in all zones on the route directly, without performing the operations at block 620. In various embodiments, means for performing the function at block 630 may include, but are not limited to, for example, processing unit 710, DSP 720, memory 760, and/or bus 705 as illustrated in FIG. 7 and described in detail below, and processing unit 810, working memory 835, and/or bus 805 as illustrated in FIG. 8 and described in detail below.

At block 640, the UAV or the server may select a route with the lowest sum of the flight-specific ranking data for all zones on the route among the plurality of routes as the determined route between the start point and the end point. In various embodiments, means for performing the function at block 640 may include, but are not limited to, for example, processing unit 710, DSP 720, memory 760, and/or bus 705 as illustrated in FIG. 7 and described in detail below, and processing unit 810, working memory 835, and/or bus 805 as illustrated in FIG. 8 and described in detail below.

FIGS. 4-6 describe example methods of determining a flight route for a flight based on navigation assistance data. It is noted that other methods may also be used to determine a flight route for a flight based on navigation assistance data. It is also noted that even though FIGS. 4-6 describe the operations as a sequential process, some of the operations can be performed in parallel or concurrently. In addition, the order of the operations may be rearranged. An operation may have additional steps not included in the figure. Some operations may be optional, and thus may be omitted in various embodiments. For example, in various embodiments where the server sends a single overall flight-specific ranking data for each zone, rather than flight-specific ranking data for each layer of the NAD in each zone, to the UAV, the UAV may not perform operations in blocks 610 and 620 in order to determine the flight route. Some operations described in one block may be performed together with operations at another block. For example, operations in block 620 of FIG. 6 may be omitted or performed together with operations in block 630. Furthermore, embodiments of the methods may be implemented in hardware, software, firmware, middleware, microcode, hardware description languages, or any combination thereof.

V. Computer System and Wireless Device System

FIG. 7 illustrates an embodiment of a wireless device 700, which can be utilized as described herein above. For example, wireless device 700 can be used on a UAV, a station, or a server as described in relation to the embodiments previously provided herein. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various physical devices, which may be disposed at different physical locations. In some embodiments, for example, wireless device 700 can be a mobile electronic device attached to or integrated with a UAV or a mobile station. In some embodiments, wireless device 700 may be a stationary device, such as a server or a fixed station. As such, as previously indicated, components may vary from embodiment to embodiment.

Wireless device 700 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as digital signal processing chips, graphics acceleration processors, application specific integrated circuits (ASICs), and/or the like), and/or other processing structure or means, which can be configured to perform one or more of the methods described herein. As shown in FIG. 7, some embodiments may have a separate DSP 720, depending on desired functionality. Wireless device 700 also can include one or more input devices 770, which can include without limitation a touch screen, a touch pad, microphone, button(s), dial(s), switch(es), and/or the like; and one or more output devices 715, which can include without limitation a display, light emitting diodes (LEDs), speakers, and/or the like.

Wireless device 700 might also include a wireless communication subsystem 730, which can include without limitation a modem, a network card, an infrared communication device, a wireless communication device, and/or a chipset (such as a Bluetooth device, an IEEE 802.11 device (e.g., a device utilizing one or more of the 802.11 standards described herein), an IEEE 802.15.4 device, a WiFi device, a WiMax device, cellular communication facilities, etc.), and/or the like. Wireless communication subsystem 730 may permit data to be exchanged with a network, a station, wireless access points, other computer systems, and/or any other electronic devices described herein, such as the configuration of FIG. 1. The communication can be carried out via one or more wireless communication antenna(s) 732 that send and/or receive wireless signals 734.

Depending on the desired functionality, wireless communication subsystem 730 can include separate transceivers to communicate with stations and other wireless devices and access points, which may include communicating with different data networks and/or network types, such as WWANs, WLANs, or WPANs. A WWAN may be, for example, a CDMA network, a TDMA network, an FDMA network, an OFDMA network, an SC-FDMA network, a WiMax (IEEE 802.16), and so on. A CDMA network may implement one or more RATs such as cdma2000, W-CDMA, and so on. Cdma2000 includes IS-95, IS-2000, and/or IS-856 standards. A TDMA network may implement GSM, D-AMPS, or some other RATs. An OFDMA network may employ LTE, LTE Advanced, and so on. LTE, LTE Advanced, GSM, and W-CDMA are described in documents from 3GPP. Cdma2000 is described in documents from 3GPP2. 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

Wireless device 700 may include a clock 745 on bus 705, which can generate a signal to synchronize various components on bus 705. Clock 745 may include an inductor-capacitor (LC) oscillator, a crystal oscillator, a ring oscillator, a digital clock generator such as a clock divider or clock multiplexer, a phase locked loop, or other clock generator. As indicated previously, the clock may be synchronized (or substantially synchronized) with corresponding clocks on other wireless devices. Clock 745 may be driven by wireless communication subsystem 730, which may be used to synchronize clock 745 of wireless device 700 to one or more other devices.

Wireless device 700 can further include sensor(s) 740. Such sensors can include, without limitation, one or more accelerometer(s), gyroscope(s), camera(s), magnetometer(s), altimeter(s), microphone(s), proximity sensor(s), light sensor(s), position sensor(s), temperature sensor(s), wind speed gauge(s), and the like. Some or all of sensor(s) 740 may be used to collect real-time UAV observed data. Some or all of sensor(s) 740 can be utilized, among other things, for dead reckoning and/or other positioning methods. Such positioning methods may be used to determine a location of wireless device 700 and/or the associated UAV.

Embodiments of the mobile device may also include a Standard Positioning Service (SPS) receiver 780 capable of receiving signals 784 from one or more SPS satellites using an SPS antenna 782. SPS receiver 780 can extract a position of the mobile device, using conventional techniques, from SPS satellite vehicles (SVs) of an SPS system, such as global navigation satellite system (GNSS) (e.g., GPS), Galileo, Glonass, Compass, Quasi-Zenith Satellite System (QZSS) over Japan, Indian Regional Navigational Satellite System (IRNSS) over India, Beidou over China, and/or the like. Moreover, SPS receiver 780 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS system may include any combination of one or more global and/or regional navigation satellite systems and/or augmentation systems, and SPS signals may include SPS, SPS-like, and/or other signals associated with one or more such SPS systems.

Wireless device 700 may further include and/or be in communication with a memory 760. Memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

Memory 760 of wireless device 700 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the methods shown in FIGS. 4-6 might be implemented as code and/or instructions executable by wireless device 700, a processing unit within wireless device 700, and/or another device of a wireless system. In an aspect, such code and/or instructions can be used to configure and/or adapt a general purpose computer (or other device) to perform one or more operations in accordance with the described methods.

FIG. 8 illustrates components of a computing system 800, according to one embodiment. For example, computing system 800 can be used as a server, a station, or a computing device on a UAV, as described in relation to the embodiments previously provided herein, and may communicate in a wireless communication system with one or more UAVs. Computing system 800 of FIG. 8 may be a mobile or stationary device (or set of devices). It should be noted that FIG. 8 is meant only to provide a generalized illustration of various components, any or all of which may be utilized as appropriate. Moreover, system elements may be implemented in a relatively separated or relatively more integrated manner.

Computing system 800 is shown comprising hardware elements that can be electrically coupled via a bus 805 (or may otherwise be in communication, as appropriate). The hardware elements may include a processing unit 810, including without limitation one or more general-purpose processors and/or one or more special-purpose processors (such as digital signal processing chips, graphics acceleration processors, and/or the like), one or more input devices 815, and one or more output devices 820. Input device(s) 815 can include without limitation camera(s), a touchscreen, a touch pad, microphone(s), a keyboard, a mouse, button(s), dial(s), switch(es), and/or the like. Output devices 820 may include without limitation a display device, a printer, LEDs, speakers, and/or the like.

Computing system 800 may also include a wired communication subsystem 830 and wireless communication technologies managed and controlled by a wireless communication subsystem 833. As such, wired communication subsystem 830 and wireless communication subsystem 833 can include, without limitation, a modem, a network interface (wireless, wired, both, or other combination thereof), an infrared communication device, a wireless communication device, and/or a chipset (such as a Bluetooth™ device, an IEEE 802.11 device (e.g., a device utilizing one or more of the IEEE 802.11 standards described herein), a WiFi device, a WiMax device, cellular communication facilities, etc.), and/or the like. Subcomponents of the network interface may vary, depending on the type of computing system 800 (e.g., mobile phone, personal computer, etc.). Wired communication subsystem 830 and wireless communication subsystem 833 may include one or more input and/or output communication interfaces to permit data to be exchanged with a data network, other computer systems, and/or any other devices described herein.

Similar to wireless device 700 of FIG. 7, computing system 800 of FIG. 8 may include a clock 850 on bus 805, which can generate a signal to synchronize the various components on bus 805. Clock 850 may include an LC oscillator, a crystal oscillator, a ring oscillator, a digital clock generator such as a clock divider or clock multiplexer, a phase locked loop, or other clock generator. The clock may be synchronized (or substantially synchronized) with corresponding clocks on other wireless devices while performing the techniques described herein. Clock 850 may be driven by wireless communication subsystem 833, which may be used to synchronize clock 850 of computing system 800 to one or more other devices.

Computing system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a RAM and/or a ROM, which can be programmable, flash-updateable and/or the like. Such storage devices may be configured to implement any appropriate data stores, including without limitation, various file systems, database structures, and/or the like.

In many embodiments, computing system 800 may further comprise a working memory 835, which can include a RAM or ROM device, as described above. Software elements, shown as being currently located within working memory 835, can include an operating system 840, device drivers, executable libraries, and/or other code, such as one or more application programs 845, which may comprise software programs provided by various embodiments, and/or may be designed to implement methods, and/or configure systems, provided by other embodiments, as described herein, such as some or all of the methods described in relation to FIGS. 4-6. Merely by way of example, one or more procedures described with respect to the method(s) discussed above might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be stored on a non-transitory computer-readable storage medium, such as non-transitory storage device(s) 825 described above. In some cases, the storage medium might be incorporated within a computing system, such as computing system 800. In other embodiments, the storage medium might be separate from a computing system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 800 and/or might take the form of source and/or installable code, which, upon compilation and/or installation on computing system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a WWAN, a WLAN, a WPAN, and so on. The term "network" and "system" may be used interchangeably herein. A WWAN may be a CDMA network, a TDMA network, an FDMA network, an OFDMA network, an SC-FDMA network, or any combination of the above networks, and so on. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a CDMA cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites," or a combination of SVs and such terrestrial transmitters. Terrestrial transmitters may, for example, include ground-based transmitters that broadcast a pseudo noise (PN) code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV," as used herein, is intended to include terrestrial transmitters acting as pseudolites, equivalents of pseudolites, and possibly others. The terms "SPS signals" and/or "SV signals," as used herein, are intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, electrically erasable programmable read-only memory (EEPROM), compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method comprising:
   requesting, by an unmanned aerial vehicle (UAV), navigation assistance data for a flight from a server, wherein the requesting includes sending flight-specific information to the server;
   receiving, by the UAV, the navigation assistance data from the server, wherein:
      the navigation assistance data includes flight-specific ranking data for each zone of a plurality of geographic zones, the flight-specific ranking data including an order of preference of the plurality of geographic zones; and
      the flight-specific ranking data for each zone is determined based on the flight-specific information;
   determining, by the UAV, a flight route for the flight through the plurality of geographic zones based on the flight-specific ranking data for each zone of the plurality of geographic zones; and
   using, by the UAV, the determined flight route for navigation during the flight.

2. The method of claim 1, wherein the flight-specific information includes a privilege of an operator of the UAV or a privilege of the UAV.

3. The method of claim 1, wherein the flight-specific information includes characteristics of the UAV.

4. The method of claim 3, wherein the characteristics of the UAV includes at least one of a UAV type, range capability, speed capability, height capability, communication capability, physical dimension, or payload of the UAV.

5. The method of claim 1, wherein the navigation assistance data includes one or more types of navigation assistance data selected from physical obstacles, permitted zones, hazard information, prohibited areas, permission requirements, height limits, speed limits, air traffic information, weather conditions, charging stations, parking spots, and safe landing spots.

6. The method of claim 5, wherein the navigation assistance data includes, for each zone of the plurality of geographic zones, flight-specific ranking data for each type of the one or more types of navigation assistance data.

7. The method of claim 6, wherein the flight-specific ranking data for a zone of the plurality of geographic zones is a weighted sum of the flight-specific ranking data for each type of the one or more types of navigation assistance data for the zone.

8. The method of claim 1, wherein the plurality of geographic zones includes only geographic zones near a current location of the UAV.

9. The method of claim 1, further comprising:
   collecting, by the UAV, real-time UAV observed data during the flight; and
   sending, by the UAV, the real-time UAV observed data to the server during the flight.

10. The method of claim 1, wherein determining the flight route for the flight through the plurality of geographic zones includes selecting the flight route from a plurality of possible flight routes based on a sum of the flight-specific ranking data for geographic zones in each of the plurality of possible flight routes.

11. The method of claim 1, wherein determining the flight route for the flight includes determining the flight route in real time during the flight.

12. An unmanned aerial vehicle (UAV) comprising:
   a wireless communication subsystem; and
   a processing unit communicatively coupled with the wireless communication subsystem, the processing unit configured to:
      request, via the wireless communication subsystem, navigation assistance data for a flight from a server, wherein the requesting includes sending flight-specific information to the server;
      receive, via the wireless communication subsystem, the navigation assistance data from the server, wherein:
         the navigation assistance data includes flight-specific ranking data for each zone of a plurality of geographic zones, the flight-specific ranking data including an order of preference of the plurality of geographic zones; and
         the flight-specific ranking data for each zone is determined based on the flight-specific information;
      determine a flight route for the flight through the plurality of geographic zones based on the flight-specific ranking data for each zone of the plurality of geographic zones; and
      use the determined flight route for navigation during the flight.

13. The UAV of claim 12, wherein the flight-specific information includes a privilege of an operator of the UAV or a privilege of the UAV.

14. The UAV of claim 12, wherein the flight-specific information includes at least one of a UAV type, range capability, speed capability, height capability, communication capability, physical dimension, or payload of the UAV.

15. The UAV of claim 12, wherein the navigation assistance data includes one or more types of navigation assistance data selected from physical obstacles, permitted zones, hazard information, prohibited areas, permission requirements, height limits, speed limits, air traffic information, weather conditions, charging stations, parking spots, and safe landing spots.

16. The UAV of claim 12, wherein the processing unit is further configured to:
    collect, using one or more sensors, real-time UAV observed data during the flight; and
    send, via the wireless communication subsystem, the real-time UAV observed data to the server during the flight.

17. The UAV of claim 12, wherein the processing unit is configured to determine the flight route for the flight through the plurality of geographic zones by selecting the flight route from a plurality of possible flight routes based on a sum of the flight-specific ranking data for geographic zones in each of the plurality of possible flight routes.

18. The UAV of claim 12, wherein the processing unit is configured to determine the flight route for the flight in real time during the flight.

19. A non-transitory computer-readable storage medium including machine-readable instructions stored thereon that, when executed by one or more processing units, cause the one or more processing units to:
    request, via a wireless communication subsystem, navigation assistance data for a flight of an unmanned aerial vehicle (UAV) from a server, wherein the requesting includes sending flight-specific information to the server;
    receive, via the wireless communication subsystem, the navigation assistance data from the server, wherein:
        the navigation assistance data includes flight-specific ranking data for each zone of a plurality of geographic zones, the flight-specific ranking data including an order of preference of the plurality of geographic zones; and
        the flight-specific ranking data for each zone is determined based on the flight-specific information;
    determine a flight route for the flight through the plurality of geographic zones based on the flight-specific ranking data for each zone of the plurality of geographic zones; and
    use the determined flight route for navigation during the flight.

20. The non-transitory computer-readable storage medium of claim 19, wherein the flight-specific information includes a privilege of an operator of the UAV or a privilege of the UAV.

21. The non-transitory computer-readable storage medium of claim 19, wherein the flight-specific information includes at least one of a UAV type, range capability, speed capability, height capability, communication capability, physical dimension, or payload of the UAV.

22. The non-transitory computer-readable storage medium of claim 19, wherein the navigation assistance data includes one or more types of navigation assistance data selected from physical obstacles, permitted zones, hazard information, prohibited areas, permission requirements, height limits, speed limits, air traffic information, weather conditions, charging stations, parking spots, and safe landing spots.

23. The non-transitory computer-readable storage medium of claim 19, further comprising machine-readable instructions stored thereon that, when executed by the one or more processing units, cause the one or more processing units to:
    collect, using one or more sensors, real-time UAV observed data during the flight; and
    send, via the wireless communication subsystem, the real-time UAV observed data to the server during the flight.

24. The non-transitory computer-readable storage medium of claim 19, wherein determining the flight route for the flight through the plurality of geographic zones includes selecting the flight route from a plurality of possible flight routes based on a sum of the flight-specific ranking data for geographic zones in each of the plurality of possible flight routes.

25. The non-transitory computer-readable storage medium of claim 19, wherein determining the flight route for the flight includes determining the flight route in real time during the flight.

26. An apparatus comprising:
    means for requesting navigation assistance data for a flight of an unmanned aerial vehicle (UAV) from a server, wherein the requesting includes sending flight-specific information to the server;
    means for receiving the navigation assistance data from the server, wherein:
        the navigation assistance data includes flight-specific ranking data for each zone of a plurality of geographic zones, the flight-specific ranking data including an order of preference of the plurality of geographic zones; and
        the flight-specific ranking data for each zone is determined based on the flight-specific information; and
    means for determining a flight route for the flight through the plurality of geographic zones based on the flight-specific ranking data for each zone of the plurality of geographic zones; and
    means for using the determined flight route for navigation during the flight.

27. The apparatus of claim 26, wherein the flight-specific information includes a privilege of an operator of the UAV or a privilege of the UAV.

28. The apparatus of claim 26, wherein the flight-specific information includes at least one of a UAV type, range capability, speed capability, height capability, communication capability, physical dimension, or payload of the UAV.

29. The apparatus of claim 26, wherein the navigation assistance data includes one or more types of navigation assistance data selected from physical obstacles, permitted zones, hazard information, prohibited areas, permission requirements, height limits, speed limits, air traffic information, weather conditions, charging stations, parking spots, and safe landing spots.

30. The apparatus of claim 26, wherein determining the flight route for the flight through the plurality of geographic zones includes selecting the flight route from a plurality of possible flight routes based on a sum of the flight-specific ranking data for geographic zones in each of the plurality of possible flight routes.

* * * * *